US008004109B2

(12) United States Patent
Komatsu (10) Patent No.: US 8,004,109 B2
(45) Date of Patent: Aug. 23, 2011

(54) VEHICLE POWER SUPPLY APPARATUS, AND VEHICLE (75) Inventor: Masayuki Komatsu, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 33 days.

(21) Appl. No.: 12/312,154

(22) PCT Filed: Dec. 26, 2007

(86) PCT No.: PCT/JP2007/075390
§ 371 (c)(1),
(2), (4) Date: Apr. 28, 2009

(87) PCT Pub. No.: WO2008/081983
PCT Pub. Date: Jul. 10, 2008

(65) Prior Publication Data
US 2010/0038962 A1 Feb. 18, 2010

(30) Foreign Application Priority Data
Jan. 4, 2007 (JP) .................. 2007-000121

(51) Int. Cl.
B60L 1/00 (2006.01)
B60L 3/00 (2006.01)
H02G 3/00 (2006.01)
(52) U.S. Cl. ............. 307/9.1; 361/191; 307/85; 307/86; 307/87; 307/115; 701/22; 903/903
(58) Field of Classification Search .................. 361/191; 307/115, 9.1, 85–87; 903/903
See application file for complete search history.

(56) References Cited

U.S. PATENT DOCUMENTS

| 5,373,195 | A |   | 12/1994 | De Doncker et al. |
| 5,894,415 | A | * | 4/1999  | Habegger ......................... 363/65 |
| 5,929,595 | A |   | 7/1999  | Lyons et al. |
| 5,939,799 | A | * | 8/1999  | Weinstein ........................ 307/64 |
| 6,043,629 | A |   | 3/2000  | Ashley et al. |
| 7,099,756 | B2|   | 8/2006  | Sato |
| 7,212,891 | B2|   | 5/2007  | Sato |
| 7,679,217 | B2| * | 3/2010  | Dishman et al. ................ 307/64 |
| 7,723,866 | B2| * | 5/2010  | Chang ............................. 307/64 |

(Continued)

FOREIGN PATENT DOCUMENTS
JP    A 5-137268    6/1993
(Continued)

OTHER PUBLICATIONS
JP 05-137268 to Kagawa et al.—english translation, Jun. 1, 1993.*
(Continued)

Primary Examiner — Jared J Fureman
Assistant Examiner — Justen Fauth
(74) Attorney, Agent, or Firm — Oliff & Berridge (57) ABSTRACT A vehicle power supply apparatus includes a battery that is the main power storage device, a power feed line through which power is supplied to an inverter that drives a motor generator, a boost converter provided between the battery and power feed line to convert voltage, batteries that are a plurality of subpower storage devices provided parallel to each other, and a boost converter provided between the plurality of subpower storage devices and power feed line to convert voltage. The boost converter is selectively connected to any one of the plurality of subpower storage devices to convert voltage.

13 Claims, 10 Drawing Sheets

U.S. PATENT DOCUMENTS

| | | | |
|---|---|---|---|
| 2005/0270720 A1* | 12/2005 | Johnson, Jr. | 361/170 |
| 2006/0052915 A1 | 3/2006 | Sato | |
| 2006/0247829 A1 | 11/2006 | Sato | |
| 2007/0001650 A1* | 1/2007 | Soma et al. | 320/135 |

FOREIGN PATENT DOCUMENTS

| | | |
|---|---|---|
| JP | A 6-276609 | 9/1994 |
| JP | A 2002-10502 | 1/2002 |
| JP | A 2003-079069 | 3/2003 |
| JP | A 2003-209969 | 7/2003 |
| JP | A 2003-230269 | 8/2003 |
| JP | A 2004-274945 | 9/2004 |
| JP | A-2005-94917 | 4/2005 |
| JP | A 2006-158173 | 6/2006 |
| RU | 2 099 850 C1 | 12/1997 |
| RU | 2 223 183 C2 | 2/2004 |

OTHER PUBLICATIONS

JP 2006-158173 to Ishikawa et al.—english translation, Jun. 15, 2006.*

JP Patent 06-276609 to De et al.—english translation, Sep. 30, 1994.*

Japanese Office Action filed in corresponding Japanese Patent Application No. 2007-000121, mailed Jan. 19, 2010.

Russian Patent Office, *Decision on Grant Patent for Invention* (with English translation), Sep. 14, 2010, pp. 1-9 (pp. 1-4 for translation).

* cited by examiner

VEHICLE POWER SUPPLY APPARATUS, AND VEHICLE

TECHNICAL FIELD

The present invention relates to a vehicle power supply apparatus, and a vehicle. Particularly, the present invention relates to a power supply apparatus for a vehicle incorporating a main power storage device and a plurality of subpower storage devices, and the vehicle.

BACKGROUND ART

In recent years, electric cars, hybrid vehicles, fuel-cell vehicles and the like have been developed and adapted to practical use as environment-friendly vehicles. These vehicles are mounted with a motor and a power supply apparatus to drive the motor.

Japanese Patent Laying-Open No. 2003-209969 discloses a power supply control system of an electric traction motor for a vehicle. This system includes at least one inverter to supply adjusted power to the electric traction motor, a plurality of power supply stages each having a battery and an up-down voltage DC/DC converter, wired in parallel to provide DC power to at least one inverter, and a controller controlling the plurality of power supply stages such that the battery of the plurality of power supply stages is charged and discharged equally to allow the plurality of power supply stages to maintain the output voltage to at least one inverter.

In an electric car, it is desirable that the running distance allowed by one charge is as long as possible. Likewise with a hybrid vehicle that incorporates an internal combustion engine, a storage battery, and a motor, it is desirable that the running distance allowed per one charge without using the internal combustion engine is as long as possible in the case of a configuration in which the storage battery can be charged from an external source.

The amount of energy of the battery incorporated in a vehicle must be increased in order to lengthen the running distance allowed by one charge. The method of increasing the energy amount includes: 1) increasing the energy capacity per battery cell, and 2) increasing the number of mounted battery cells.

The method of the above 1) is disadvantageous in that the desired amount of capacity cannot be ensured since the upper limit is restricted in view of the strength of the case for the battery cells and the like. By the method of the above 2), a possible consideration is to increase the number of cells in series or in parallel.

The voltage will become higher when the number of battery cells is increased in series. In view of the breakdown voltage of the inverter and motor that are electrical loads, there are limitations in increasing the number of battery cells in series connection due to the upper limit by the breakdown voltage. Although the required capacitance may be ensured by connecting the battery cells in parallel, the capability of all the batteries cannot be thoroughly depleted since only some of the batteries will first become degraded if parallel connection is established without a power adjuster.

In a power supply control system that has a power adjuster provided for each battery, as disclosed in Japanese Patent Laying-Open No. 2003-209969, the configuration will become complex to result in higher cost of the apparatus. Moreover, a relay of a large current capacity must be provided at each power supply when the power supply is to be used in a switching manner. The configuration will become complex, necessitating a device for switching.

DISCLOSURE OF THE INVENTION

An object of the present invention is to provide a vehicle power supply apparatus and a vehicle, increased in the chargeable amount of energy while suppressing the number of elements in the apparatus.

The present invention is directed to a vehicle power supply apparatus, including a main power storage device, a power feed line through which power is supplied to an inverter that drives a motor, a first voltage converter provided between the main power storage device and power feed line to convert voltage, a plurality of subpower storage devices provided parallel to each other, and a second voltage converter provided between the plurality of subpower storage devices and power feed line to convert voltage.

Preferably, the second voltage converter is selectively connected to any one of the plurality of subpower storage devices to convert voltage.

Preferably, the vehicle power supply apparatus further includes a first connector provided between the main power storage device and first voltage converter to make and break electrical connection, and a second connector provided between the plurality of subpower storage devices and second voltage converter to make and break electrical connection. The second connector is controlled to attain a connection state in which any one of the plurality of subpower storage devices is selectively connected to the second voltage converter and a non-connection state in which none of the plurality of subpower storage devices is connected to the second voltage converter.

More preferably, the first connector includes a first relay connected between the main power storage device and first voltage converter, and a second relay and a limiting resistor connected in series. The second relay and limiting resistor connected in series are connected parallel to the first relay. The second connector includes a third relay connected between a first one of the plurality of subpower storage devices and the second voltage converter, and a fourth relay connected between a second one of the plurality of subpower storage devices and the second voltage converter.

Further preferably, each of the first to fourth relays is provided at a side of one electrode of a corresponding power storage device. The one electrodes have a polarity identical to each other. Each other electrode of the main power storage device and plurality of subpower storage devices is connected to a common node. Each other electrode has a polarity opposite to that of the one electrode. The vehicle power supply apparatus further includes a fifth relay provided between the common node and the first and second voltage converters.

Further preferably, the vehicle power supply apparatus further includes a control unit conducting control of the first and second voltage converters, and conducting opening and closing control of the first to fourth relays. The control unit renders at least one of the first and second relays conductive, and has voltage on the power feed line converted to the voltage of the first subpower storage device by the first voltage converter, and then renders the third relay conductive.

Further preferably, the vehicle power supply apparatus further includes a control unit conducting control of the first and second voltage converters, and conducting opening and closing control of the first to fourth relays. The control unit controls the first and second voltage converters such that the power transfer between the first subpower storage device and power feed line becomes zero when the third relay is changed from a conductive state to a non-conductive state.

Further preferably, the control unit stops the operation of the second voltage converter after the voltage on the power feed line is increased to a level higher than the voltage of the first subpower storage device by actuating any of the first and second voltage converters and inverter to cause the power transfer between the first subpower storage device and power feed line to become zero.

Further preferably, the vehicle power supply apparatus further includes a control unit conducting control of the first and second voltage converters, and conducting opening and closing control of the first to fourth relays. The control unit renders the third relay non-conductive, and then renders the fourth relay conductive after adjusting the voltage at the power feed line to the voltage of the second subpower storage device by actuating the first voltage converter.

Preferably, the first subpower storage device among the plurality of subpower storage devices and the main power storage device can output the maximum power tolerable for the electrical load connected to the power feed line.

Preferably, the vehicle power supply apparatus further includes a single control unit conducting control of the first and second voltage converters, and conducting opening and closing control of the first to fourth relays. The control unit further controls said inverter.

According to another aspect, the present invention is directed to a vehicle incorporating any of the vehicle power supply apparatus set forth above.

According to the present invention, the chargeable amount of energy can be increased while suppressing the number of elements in the apparatus that is to be incorporated in a vehicle.

BEST MODES FOR CARRYING OUT THE INVENTION

Embodiments of the present invention will be described in detail hereinafter with reference to the drawings. In the drawings, the same or corresponding elements have the same reference characters allotted, and description thereof will not be repeated.

Figure 1:
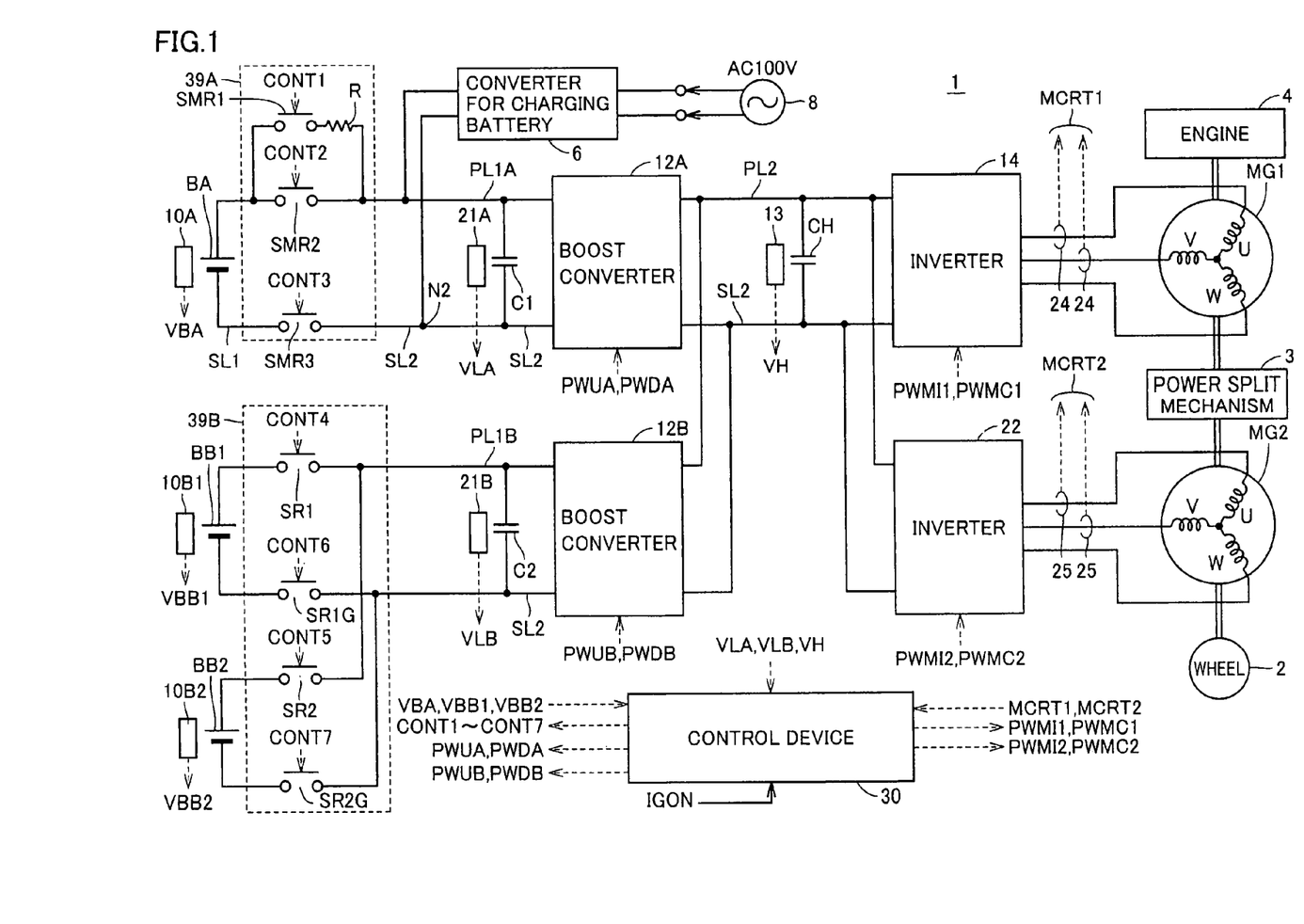
FIG. 1 represents a main configuration of a vehicle 1 according to an embodiment of the present invention.

FIG. 1 represents a main configuration of a vehicle 1 according to an embodiment of the present invention.

Referring to FIG. 1, vehicle 1 includes batteries BA, BB1, and BB2 that are power storage devices, connectors 39A and 39B, boost converters 12A and 12B, smoothing capacitors C1, C2 and CH, voltage sensors 10A, 10B1, 10B2, 13, 21A and 21B, inverters 14 and 22, an engine 4, motor generators MG1 and MG2, a power split mechanism 3, a wheel 2, and a control device 30.

The vehicle power supply apparatus of the present embodiment includes battery BA that is the main power storage device, a power feed line PL2 through which power is supplied to inverter 22 that drives motor generator MG2, boost converter 12A provided between the main power storage device (BA) and power feed line PL2, qualified as the voltage converter converting voltage, batteries BB1 and BB2 provided parallel to each other, qualified as a plurality of subpower storage devices, and boost converter 12B provided between the plurality of subpower storage devices (BB1, BB2) and power feed line PL2, qualified as a voltage converter to convert voltage.

The voltage converter (12B) is selectively connected to any one of the plurality of subpower storage devices (BB1, BB2) to carry out voltage conversion.

The subpower storage device (either BB1 or BB2) and the main power storage device (BA) have the chargeable capacitance set such that the tolerable maximum power of the electrical load (22 and MG2) connected to the power feed line can be output by simultaneous usage, for example. Accordingly, running at the maximum power is allowed in an EV (Electric Vehicle) run that does not use the engine. If the storage state of the subpower storage device is degraded, the subpower storage device can be exchanged to conduct further running. When the power of the subpower storage device is consumed, running at the maximum power is allowed by using the engine in addition to the main power storage device without the subpower storage device being used.

According to the configuration set forth above, the number of boost converters does not have to be increased as much as the number of power storage devices since boost converter 12B is shared among a plurality of subpower storage devices. In order to further increase the EV running distance, a battery is to be added, parallel to batteries BB1 and BB2.

Preferably, the power storage device incorporated in the vehicle can be charged from an external source. For this purpose, vehicle 1 further includes a battery charger (6) to connect with a commercial power supply 8 of AC100V, for example. The battery charger (6) converts an alternating current into direct current and also adjusts the voltage to be supplied to the battery. For the purpose of allowing external charging, the scheme of connecting the neutral points of the stator coils of motor generators MG1 and MG2 with an AC power supply, or the scheme of combining boost converters 12A and 12B to function as an AC/DC converter may be employed.

Smoothing capacitor C1 is connected between a power supply line PL1A and a ground line SL2. Voltage sensor 21A detects and provides to control device 30 a voltage VLA across smoothing capacitor C1. Boost converter 12A boosts the voltage across smoothing capacitor C1.

Smoothing capacitor C2 is connected between a power supply line PL1B and ground line SL2. Voltage sensor 21B detects and provides to control device 30 a voltage VLB across smoothing capacitor C2. Boost converter 12B boosts the voltage across smoothing capacitor C2.

Smoothing capacitor CH smoothes the voltage boosted by boost converters 12A and 12B. Voltage sensor 13 senses and provides to control device 30 a voltage VH across smoothing capacitor CH.

Inverter 14 converts the DC voltage applied from boost converter 12B or 12A into a 3-phase AC voltage, which is provided to motor generator MG1. Inverter 22 converts the DC voltage applied from boost converter 12B or 12A into a 3-phase AC voltage, which is provided to motor generator MG2.

Power split mechanism 3 is coupled to engine 4 and motor generators MG1 and MG2 to split the power therebetween. For example, a planetary gear mechanism including three rotational shafts of a sun gear, a planetary carrier, and a ring gear may be employed as the power split mechanism. In the planetary gear mechanism, when the rotation of two of the three rotational shafts is determined, the rotation of the remaining one rotational shaft is inherently determined. These three rotational shafts are connected to each rotational shaft of engine 4, motor generator MG1, and motor generator MG2, respectively. The rotational shaft of motor generator MG2 is coupled to wheel 2 by means of a reduction gear and/or differential gear not shown. Further, a reduction gear for the rotational shaft of motor generator MG2 may be additionally incorporated in power split mechanism 3.

Connector 39A includes a system main relay SMR2 connected between the positive electrode of battery BA and power supply line PL1A, a system main relay SMR1 and a limiting resistor R connected in series, parallel with system main relay SMR2, and a system main relay SMR3 connected between the negative electrode of battery BA (ground line SL1) and a node N2.

System main relays SM1 to SMR3 have their conductive/non-conductive state controlled according to control signals CONT1 to CONT3, respectively, applied from control device 30.

Voltage sensor 10A measures voltage VBA across battery BA. Although not shown, a current sensor sensing the current flowing to battery BA is provided to monitor the state of charge of battery BA, together with voltage sensor 10A. For battery BA, a secondary battery such as a lead battery, nickel-hydride battery, and lithium ion battery, or a capacitor of large capacitance such as an electrical double layer capacitor may be employed.

Connector 39B is provided between power supply line PL1B and ground line SL2 and batteries BB1, BB2. Connector 39B includes a relay SR1 connected between the positive electrode of battery BB1 and power supply line PL1B, a relay SR1G connected between the negative electrode of battery BB1 and ground line SL2, a relay SR2 connected between the positive electrode of battery BB2 and power supply line PL1B, and a relay SR2G connected between the negative electrode of battery BB2 and ground line SL2. Relays SR1 and SR2 have their conductive/non-conductive state controlled according to control signals CONT4 and CONT5, respectively, applied from control device 30. Relays SR1G and SR2G have their conductive/non-conductive state controlled according to control signals CONT6 and CONT7, respectively, applied from control device 30. Ground line SL2 runs through boost converters 12A and 12B towards inverters 14 and 22, as will be described afterwards.

Voltage sensor 10B1 measures a voltage VBB1 across battery BB1. Voltage sensor 10B2 measures a voltage VBB2 across batteries BB2. Although not shown, a current sensor to sense the current flowing to each battery is provided to monitor the state of charge of batteries BB1 and BB2, together with voltage sensors 10B1 and 10B2. For batteries BB1 and BB2, a secondary battery such as a lead battery, nickel-hydride battery, and lithium ion battery, or a capacitor of large capacitance such as an electrical double layer capacitor may be employed.

Inverter 14 is connected to power feed line PL2 and ground line SL2. Inverter 14 receives the boosted voltage from boost converters 12A and 12B to drive motor generator MG1 for the purpose of, for example, starting engine 4. Further, inverter 14 returns to boost converters 12A and 12B the electric power generated at motor generator MG1 by the power transmitted from engine 4. At this stage, boost converters 12A and 12B are controlled by control device 30 to function as down-conversion circuits.

Current sensor 24 detects the current flowing to motor generator MG1 as a motor current value MCRT1, which is provided to control device 30.

Inverter 22 is connected to power feed line PL2 and ground line SL, parallel with inverter 14. Inverter 22 converts DC voltage output from boost converters 12A and 12B into a 3-phase AC voltage, which is provided to motor generator MG2 that drives wheel 2. Inverter 22 also returns the power generated at motor generator MG2 to boost converters 12A and 12B in accordance with regenerative braking. At this stage, boost converters 12A and 12B are controlled by control device 30 to function as down-conversion circuits.

Current sensor 25 detects the current flowing to motor generator MG2 as a motor current value MCRT2. Motor current value MCRT2 is output to control device 30.

Control device 30 receives each torque command value and rotation speed of motor generators MG1 and MG2, each value of voltages VBA, VBB1, VBB2, VLA, VLB, and VH, motor current values MCRT1, MCRT2, and an activation signal IGON. Control device 30 outputs to boost converter 12B a control signal PWUB to effect a voltage boosting instruction, a control signal PWDB to effect a voltage down-conversion instruction, and a shut down signal to effect an operation prohibition instruction.

Further, control device 30 outputs to inverter 14 a control signal PWMI1 to effect a drive instruction for converting DC voltage that is the output from boost converters 12A and 12B into AC voltage directed to driving motor generator MG1, and a control signal PWMC1 to effect a regenerative instruction for converting the AC voltage generated at motor generator MG1 into a DC voltage to be returned towards boost converters 12A and 12B.

Similarly, control device 30 outputs to inverter 22 a control signal PWMI2 to effect a drive instruction for converting the AC voltage directed to driving motor generator MG2 into a DC voltage, and a control signal PWMC2 to effect a regenerative instruction for converting the AC voltage generated at motor generator MG2 into a DC voltage to be returned towards boost converters 12A and 12B.

Figure 2:
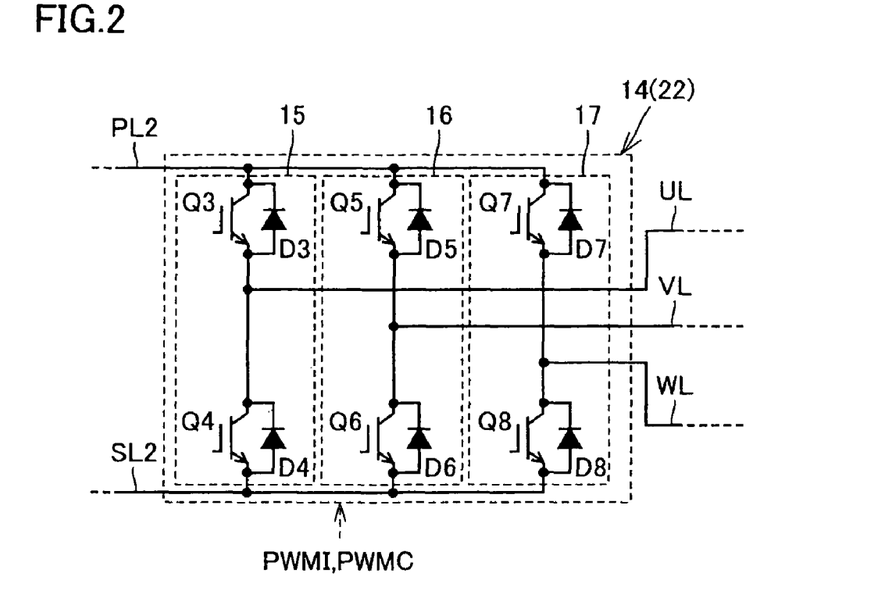
FIG. 2 is a circuit diagram representing a detailed configuration of inverters 14 and 22 of FIG. 1.

FIG. 2 is a circuit diagram representing a detailed configuration of inverters 14 and 22 of FIG. 1.

Referring to FIGS. 1 and 2, inverter 14 includes a U-phase arm 15, a V-phase arm 16, and a W-phase arm 17. U-phase arm 15, V-phase arm 16, and W-phase arm 17 are connected in parallel between power feed line PL2 and ground line SL2.

U-phase arm 15 includes IGBT elements Q3 and Q4 connected in series between power feed line PL2 and ground line SL2, and diodes D3 and D4 connected in parallel with IGBT elements Q3 and Q4, respectively. Diode D3 has its cathode connected to the collector of IGBT element Q3, and its anode connected to the emitter of IGBT element Q3. Diode D4 has its cathode connected to the collector of IGBT element Q4, and its anode connected to the emitter of IGBT element Q4.

V-phase arm 16 includes IGBT elements Q5 and Q6 connected in series between power feed line PL2 and ground line SL2, and diodes D5 and D6 connected in parallel with IGBT elements Q5 and Q6, respectively. Diode D5 has its cathode connected to the collector of IGBT element Q5, and its anode connected to the emitter of IGBT element Q5. Diode D6 has its cathode connected to the collector of IGBT element Q6, and its anode connected to the emitter of IGBT element Q6.

W-phase arm 17 includes IGBT elements Q7 and Q8 connected in series between power feed line PL2 and ground line SL2, and diodes D7 and D8 connected in parallel with IGBT elements Q7 and Q8, respectively. Diode D7 has its cathode connected to the collector of IGBT element Q7, and its anode connected to the emitter of IGBT element Q7. Diode D8 has its cathode connected to the collector of IGBT element Q8, and its anode connected to the emitter of IGBT element Q8.

The intermediate point of each phase arm is connected to each phase end of each phase coil of motor generator MG1. Specifically, motor generator MG1 is a 3-phase permanent magnet synchronous motor. The three coils of the U, V and W-phase have each one end connected together to the neutral point. The other end of the U-phase coil is connected to a line UL drawn out from the connection node of IGBT elements Q3 and Q4. The other end of the V-phase coil is connected to a line VL drawn out from the connection node of IGBT elements Q5 and Q6. The other end of the W-phase coil is connected to a line WL drawn out from the connection node of IGBT elements Q7 and Q8.

Inverter 22 of FIG. 1 is similar to inverter 14 as to the internal circuit configuration, provided that it is connected to motor generator MG2. Therefore, detailed description thereof will not be repeated. For the sake of simplification, FIG. 2 is depicted with control signals PWMI and PWMC applied to the inverter. Different control signals PWMI1 and PWMC1, and control signals PWMI2 and PWMC2 are applied to inverters 14 and 22, respectively, as shown in FIG. 1.

Figure 3:
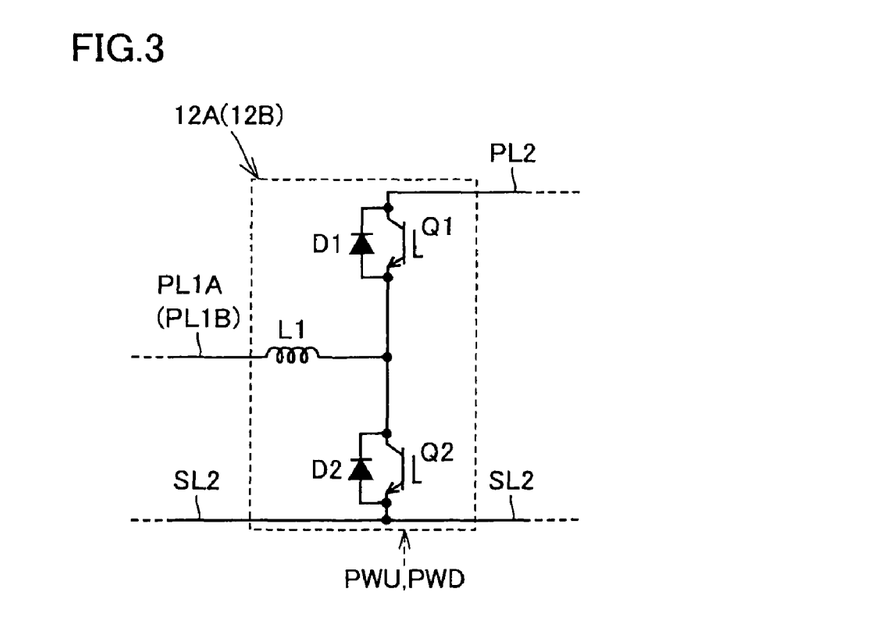
FIG. 3 is a circuit diagram representing a detailed configuration of boost converters 12A and 12B of FIG. 1.

FIG. 3 is a circuit diagram representing a detailed configuration of boost converters 12A and 12B of FIG. 1.

Referring to FIGS. 1 and 3, boost converter 12A includes a reactor L1 having one end connected to power supply line PL1A, IGBT terminals Q1 and Q2 connected in series between power feed line PL2 and ground line SL2, and diodes D1 and D2 connected in parallel with IGBT elements Q1 and Q2, respectively.

Reactor L1 has the other end connected to the emitter of IGBT element Q1 and the collector of IGBT element Q2. Diode D1 has its cathode connected to the collector of IGBT element Q1 and its anode connected to the emitter of IGBT element Q1. Diode D2 has its cathode connected to the collector of IGBT element Q2 and its anode connected to the emitter of IGBT element Q2.

Boost converter 12B of FIG. 1 is similar to boost converter 12A in the internal circuit configuration, provided that it is connected to power supply line PL1B, instead of power supply line PL1A. Therefore, detailed description thereof will not be repeated. Further, for the sake of simplification, FIG. 3 is depicted with control signals PWU and PWD applied to the boost converter. As shown in FIG. 1, different control signals PWUA and PWDA and control signals PWUB and PWDB are applied to boost converters 12A and 12B, respectively.

Figure 4:
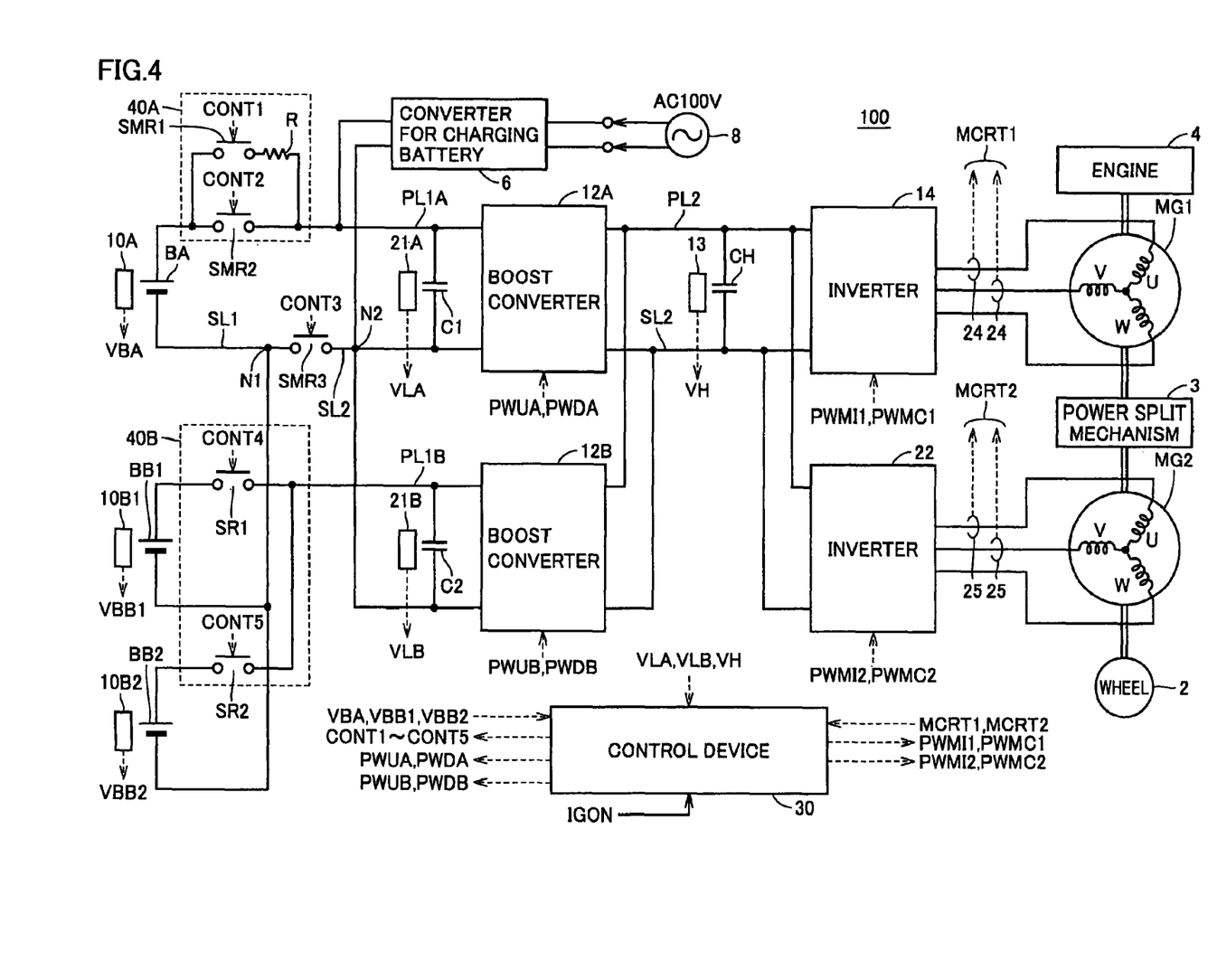
FIG. 4 represents a configuration of a vehicle 100 according to a modification of vehicle 1 of FIG. 1.

FIG. 4 represents a configuration of a vehicle 100 that is a modification of vehicle 1 of FIG. 1.

Referring to FIG. 4, vehicle 100 includes batteries BA, BB1 and BB2 that are power storage devices, connectors 40A and 40B, a system main relay SMR3, boost converters 12A and 12B, smoothing capacitors C1, C2 and CH, voltage sensors 10A, 10B1, 10B2, 13, 21A and 21B, inverters 14 and 22, engine 4, motor generators MG1 and MG2, power split mechanism 3, wheel 2, and control device 30. In other words, vehicle 100 differs from vehicle 1 in that it includes connectors 40A and 40B instead of connectors 39A and 39B, and system main relay SMR3 at the negative electrode side shared among batteries BA, BB1 and BB2 is provided in addition to connector 40A.

Connector 40A includes a system main relay SMR2 connected between the positive electrode of battery BA and power supply line PL1A, and a system main relay SMR1 and a limiting resistor R connected in series, parallel to system main relay SMR2. The negative electrode of battery BA is connected to ground line SL1.

Connector 40B is provided between power supply line PL1B and the positive electrodes of batteries BB1 and BB2. Connector 40B includes relay SR1 connected between the positive electrode of battery BB1 and power supply line PL1B, and relay SR2 connected between the positive electrode of battery BB2 and power supply line PL1B. Relays SR1 and SR2 have their conductive/non-conductive state controlled by control signals CONT4 and CONT5, respectively, applied from control device 30. The negative electrodes of batteries BB1 and BB2 are both connected to ground line SL1.

In FIG. 4, system main relay SMR3 is connected between ground line SL2 and a node N1 where the path from the negative electrode of battery BA identified as the main power storage device joins the path from each negative electrode of batteries BB1 and BB2 identified as subpower storage devices, different from FIG. 1. It is to be noted that the number of relays can be reduced by using one system main relay SMR3 as the relay to disconnect the negative electrode of the main power storage device from the system and as the relay to disconnect the negative electrode of a subpower storage device from the system.

The configuration and operation of the remaining elements in vehicle 100 are similar to those of vehicle 1 of FIG. 1. Therefore, description thereof will not be repeated.

Figure 5:
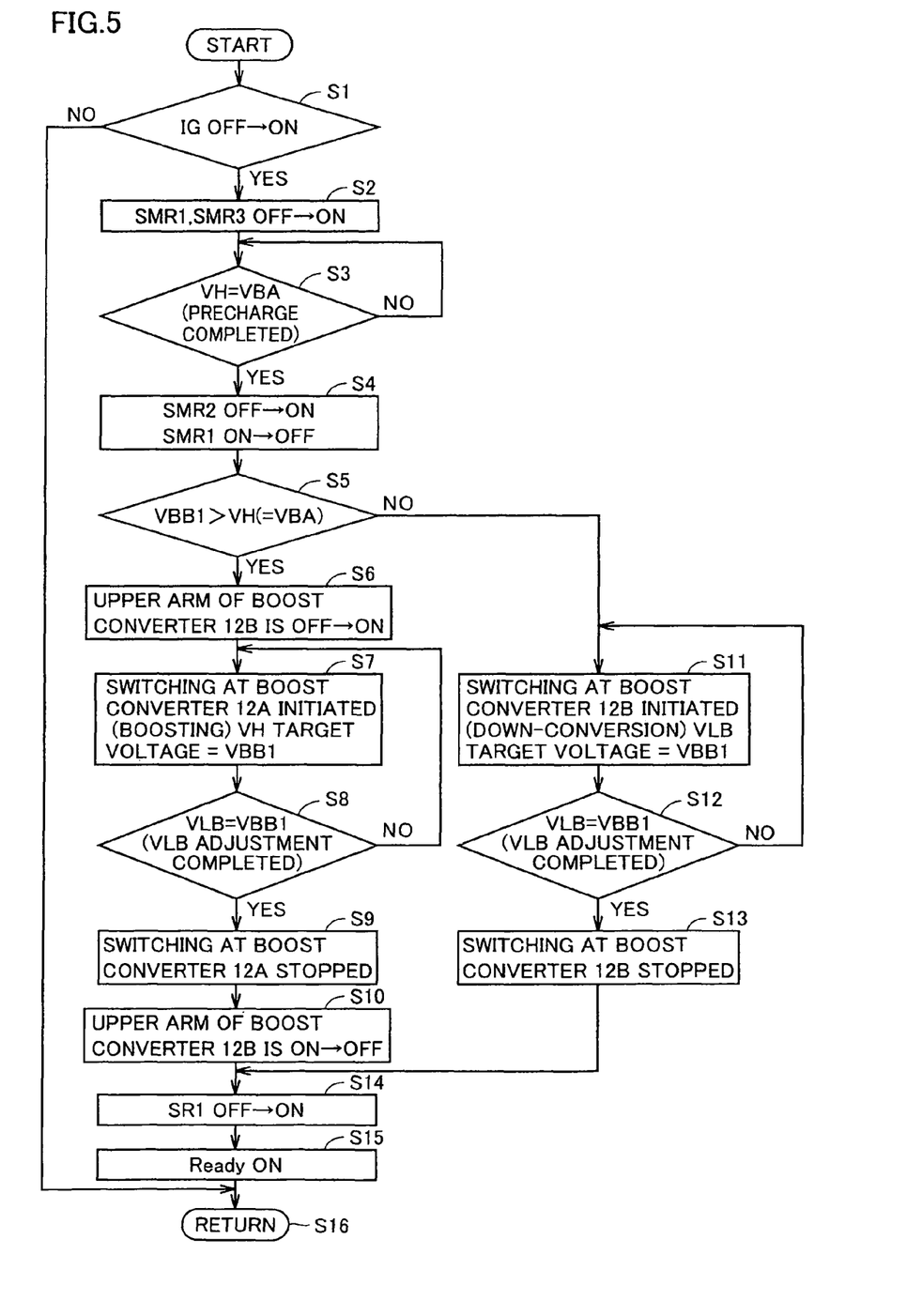
FIG. 5 is a flow chart to describe control carried out by a control device 30 when the power supply system is activated.

FIG. 5 is a flow chart to describe control carried out by control device 30 when the power supply system is activated. The process of this flow chart is invoked from a predetermined main routine at every elapse of a predetermined time or every time a predetermined condition is established to be executed.

Figure 6:
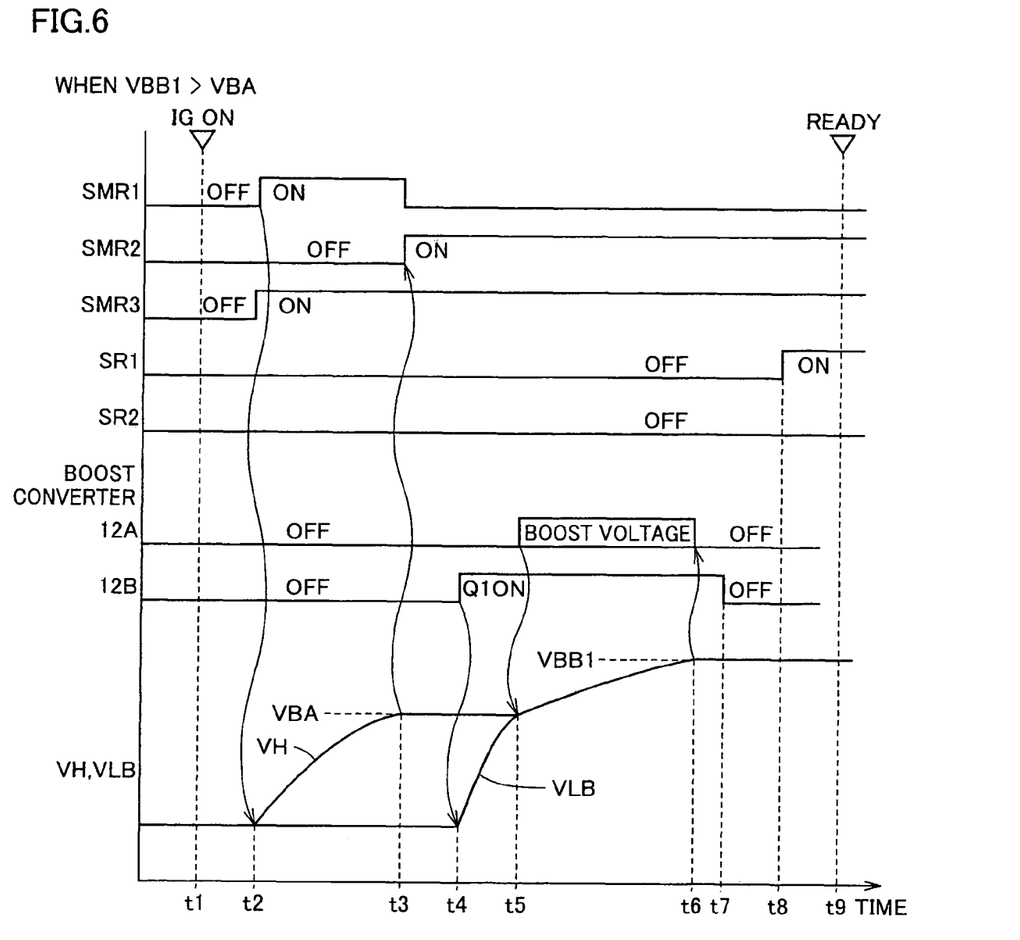
FIG. 6 is an operation waveform chart representing an example when an operation is carried out based on the flow chart of FIG. 5.

FIG. 6 is an operation waveform diagram representing an example when an operation is carried out according to the flow chart of FIG. 5. This operation waveform diagram corresponds to an example executed based on a battery combination and state of charge where power supply voltage VBB1 of battery BB1 is higher than power supply voltage VBA of battery BA.

Although the description of the operation set forth below is presented in association with a power supply apparatus incorporated in vehicle 100 of FIG. 4, a similar operation can be realized at the power supply apparatus incorporated in vehicle 1 of FIG. 1 by connecting and opening relays SR1G and SR2G simultaneous to system main relay SMR3.

Referring to FIGS. 5 and 6, detection is made of the transition of activation signal IG from an OFF state to an ON state at step S1. A rise of the activation signal is not detected at step S1 until time t1. Therefore, the process proceeds to step S16, and control returns to the main routine.

In the event of activation signal IG rendered active to an ON state at time t1, control device 30 detects this activation at step S1. The process proceeds to step S2. At step S2, control device 30 changes control signals CONT3 and CONT1 to cause system main relay SMR3 to attain a conductive state from a non-conductive state, and system main relay SMR1 to a conductive state from a non-conductive state. Accordingly, system main relays SMR1 and SMR3 are both rendered conductive at time t2.

In response, a current is supplied from battery BA towards power supply line PL1A via limiting resistor R. Prior to system activation, voltage VH is often zero since capacitor CH is constantly discharged. Therefore, a forward current flows towards diode D1 in boost converter 12A, so that capacitor CH is gradually charged at time t2 to time t3. Accordingly, voltage VH rises to the level of power supply voltage VBA of battery BA. The reason why capacitor CH is precharged via limiting resistor R is to avoid welding at the system main relay due to excessive current input.

At step S3, control device 30 monitors voltage VH by means of voltage sensor 13 to determine whether the level has rose to the vicinity of battery voltage VBA. This determination can be made based on, for example, whether |VH−VBA| is smaller than a predetermined threshold value. When determination is made that voltage VH has not rose enough and the precharging of capacitor CH has not yet completed at step S3, the process of step S3 is executed again to wait until the voltage rises. As an alternative to such a determination at step S3, a process to wait for the elapse of the longest period of time required for precharging capacitor CH may be carried out instead.

When completion of precharging capacitor CH has been determined at step S3, control proceeds to step S4. At step S4, control device 30 changes the state of system main relay SMR2 to a conductive state from a non-conductive state and the state of system main relay SMR1 to a non-conductive state from a conductive state, as shown at time t3. Accordingly, a current can be supplied from battery BA to boost converter 12A without passing through limiting resistor R.

Upon completion of the relay switching at step S4, control proceeds to step S5 to determine whether voltage VBB1 of battery BB1 is higher than voltage VH. This determination at step S5 may be omitted in the case where VBB1>VBA is inevitably established in view of the monitored state of charge of batteries BB1 and BA and/or the selected type of battery and the number of battery cells employed for each of battery BB1 and battery BA.

The example shown in FIG. 6 corresponds to VBB1>VBA. Therefore, control proceeds from step S5 to step S6. The event of VBB1<VBA will be described afterwards with reference to FIG. 7. At step S6, the upper arm of boost converter 12B, i.e. IGBT element Q1 in FIG. 3, is set to an ON state. Accordingly, at time t4-t5, capacitor C2 is also charged. Voltage VLB rises up to a level substantially equal to voltage VH.

Then, at step S7, control device 30 sets the target voltage of voltage VH to voltage VBB1, and causes boost converter 12A to start a boosting operation. At this stage in boost converter 12A, the duty ratio is set so that a boosting operation is carried out, and the switching of IGBT elements Q1 and Q2 is carried out. As a result, voltage VH is boosted towards the level of voltage VBB1 at time t5-t6. Voltage VLB follows voltage VH and also rises towards the level of voltage VBB1.

At step S8, determination is made whether voltage VLB is equal to voltage VBB1. This determination can be made by identifying whether |VLB−VBB1| is less than a predetermined threshold value.

In the case where voltage VLB has not yet rose enough and does not reach the level of voltage VBB1 at step S8, control returns to step S7, and the boosting operation is continued.

When voltage VLB is substantially equal to voltage VBB1, excessive current will not be input when relay SR1 is connected. Therefore, control device 30 raises voltage VLB up to the vicinity of voltage VBB1. Control proceeds from step S8 to step S9 to stop the boosting operation of boost converter 12A, as shown at time t6.

At step S10, the upper arm of boost converter 12B is returned to an OFF state from an ON state, as shown at time t7. At step S14, relay SR1 is rendered conductive, as shown at time t8. Then, a "ready" lamp notifying the completion of activation is turned on at step S15, as shown at time t9.

The control when voltage VH is higher than voltage VBB1 at step S5 will be described hereinafter. In this case, control proceeds from step S5 to step S11.

Figure 7:
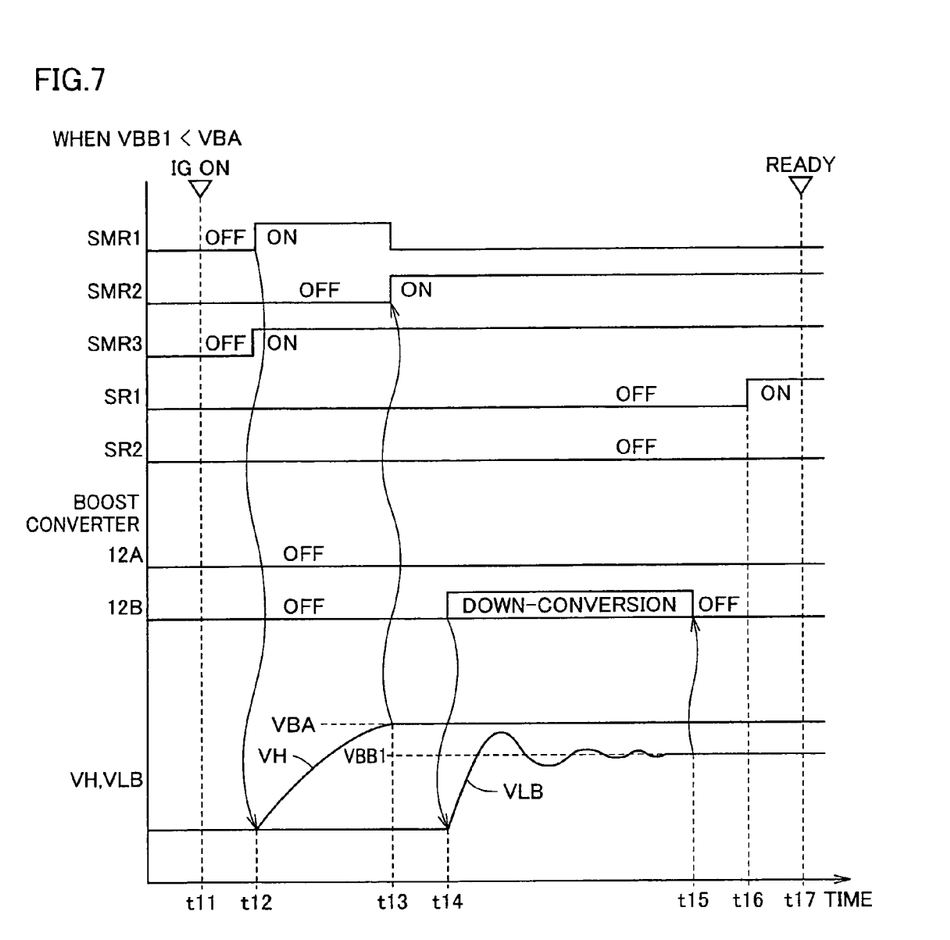
FIG. 7 is an operation waveform chart representing another example when an operation is carried out based on the flow chart of FIG. 5.

FIG. 7 is an operation waveform diagram representing another example when an operation is carried out based on the flow chart of FIG. 5. This operation waveform diagram corresponds to an example executed based on a battery combination and state of charge where power supply voltage VBB1 of battery BB1 is lower than power supply voltage VBA of battery BA.

In FIG. 7, time t11, t12 and t13 correspond to time t1, t2, and t3, respectively, of FIG. 6. Since the change in waveform up to time t13 is similar to that in FIG. 6, description thereof will not be repeated.

Referring to FIG. 7, VH becomes higher than VBB1 when precharging of capacitor CH has been completed and the switching from system main relay SMR1 to system main relay SMR2 has been completed at time t13. Therefore, control proceeds from step S5 to step S11 in FIG. 5.

At step S11, a voltage-down instruction is issued towards boost converter 12B. The target level of voltage VLB is set at the level of voltage VBB1. At step S12, determination is made whether voltage VLB is substantially equal to voltage VBB1. For example, this determination may be made by identifying whether |VLB−VBB1| is smaller than a predetermined threshold value.

In the case where voltage VLB is not in the vicinity of the level of voltage VBB1 at step S12, control returns to step S11 where the voltage-down operation is continued.

Although voltage VLB will first rise in accordance with the charging of capacitor C2 immediately after the operation of boost converter 12B is initiated as shown at time t14, voltage VLB gradually converges towards voltage VBB1 thereafter.

When voltage VLB approaches the level of voltage VBB1 sufficiently so that the condition in step S12 is met at time t15, control proceeds from step S12 to step S13. Control device 30 stops the switching at boost converter 12B.

Then, control device 30 renders relay SR1 conductive at step S14, as shown at time t16. A "ready" lamp representing completion of activation is turned on, as shown at time t17.

When the procedure of step S15 ends, control is shifted to the main routine at step S16.

Thus, since relay SR1 is connected after-adjusting voltage VLB to the vicinity of voltage VBB of battery BB1 using boost converter 12A, a duplicating current path of limiting resistor R and system main relay SMR1 does not have to be provided with respect to battery BB1. By conducting similar control in the connection of battery BB2, a duplicating current path of limiting resistor R and system main relay SMR1 also does not have to be provided with respect to battery BB2.

Figure 8:
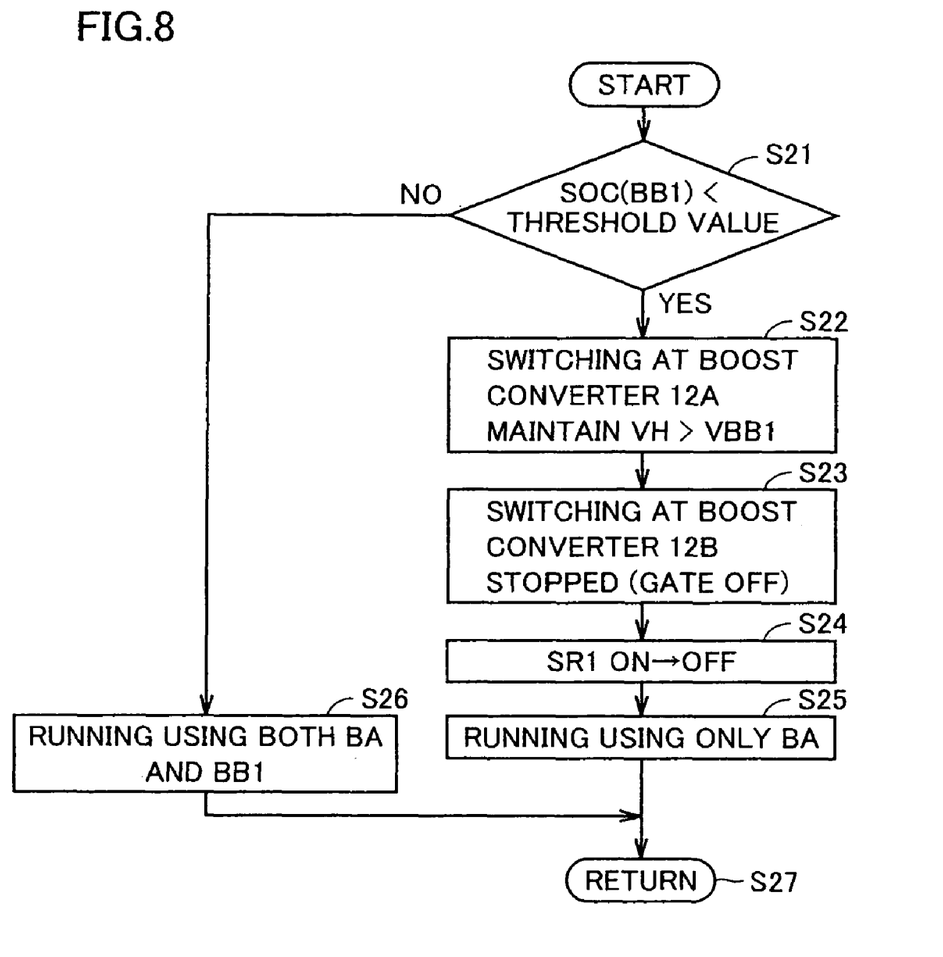
FIG. 8 is a flow chart to describe control carried out by control device 30 when a battery BB1 that is a subpower storage device is disconnected.

FIG. 8 is a flow chart to describe control carried out by control device 30 when a battery BB1 that is a subpower storage device is disconnected. The process of this flow chart is invoked from a predetermined main routine at every elapse of a predetermined time or every time a predetermined condition is established to be executed.

Referring to FIGS. 1 and 8, control device 30 determines whether the state of charge SOC (BB1) of battery BB1 that is currently used has become lower than a predetermined threshold value at step S21. In the case where the state of charge SOC (BB1) is equal to or higher than the predetermined threshold value, control proceeds to step S26 since battery BB1 can be used ongoingly. At step S26, control device 30 selects running the vehicle using both batteries BA and BB1. Then, control proceeds to step S27 to return to the main routine.

When the state of charge SOC (BB1) is lower than the predetermined threshold value, control proceeds to step S22 since battery BB1 cannot be discharged anymore.

At step S22, control device 30 switches boost converter 12A to maintain voltage VH at a level higher than voltage VBB1. Accordingly, forward current will not flow towards diode D1 of FIG. 3 even if boost converter 12B attains a stopped state. Therefore, at step S23, the switching at boost converter 12B is stopped, attaining a shut down state in which both the gates of IGBT elements Q1 and Q2 are OFF.

This eliminates the concern about welding caused by discharge when relay SR1 is disconnected since current will not flow to relay SR1. Control device 30 disconnects relay SR1 at step S24, and selects a running mode using only battery BA at step S25.

In the running mode using only battery BA at step S25, engine 4 is operated as necessary to generate the torque that is directly conveyed for the rotation of the wheel and/or the torque to operate motor generator MG1 for power generation.

Figure 9:
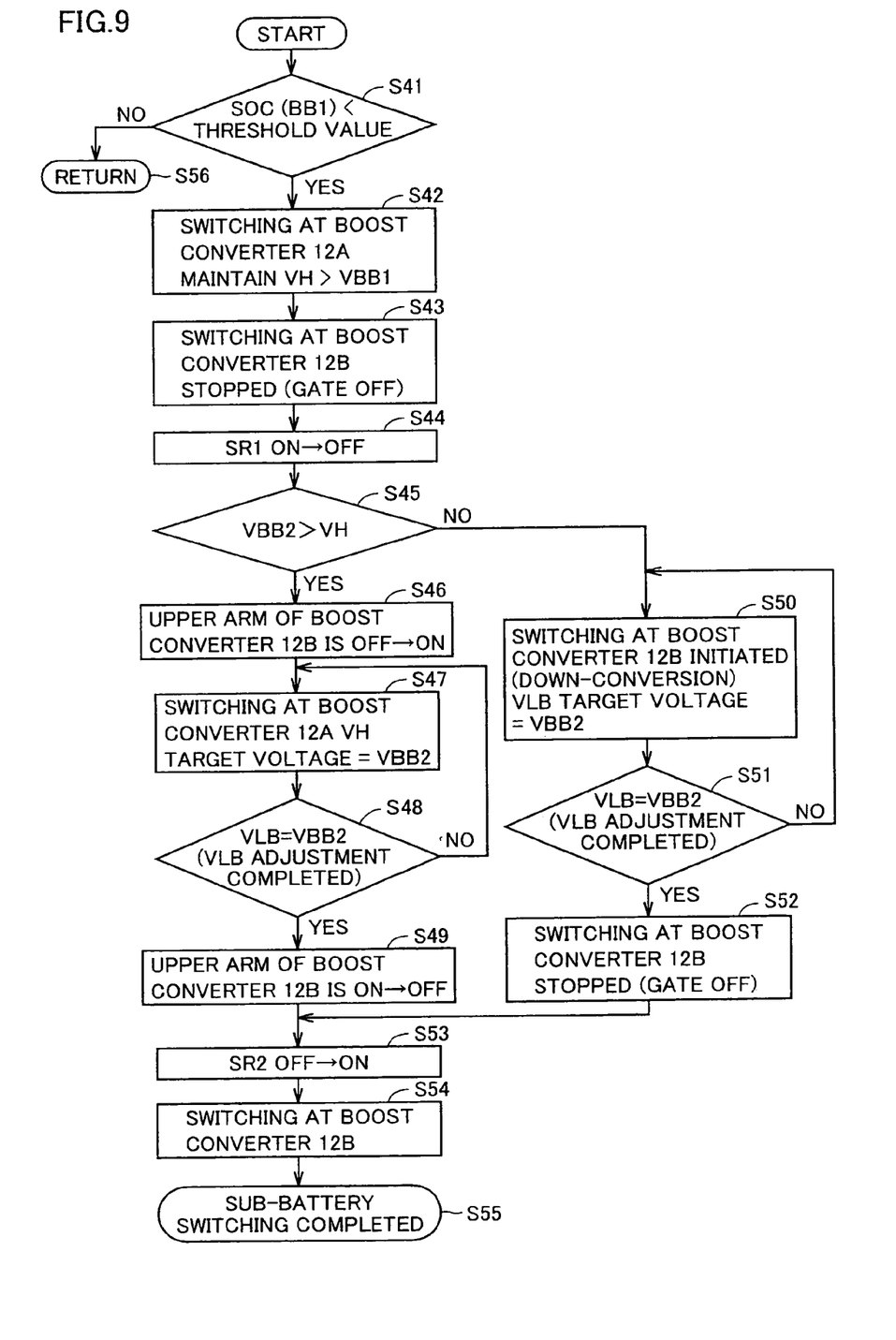
FIG. 9 is a flow chart to describe control carried out by control device 30 when a subpower storage device is switched.

FIG. 9 is a flow chart to describe control carried out by control device 30 when a subpower storage device is switched. The process of this flow chart is invoked from a predetermined main routine at every elapse of a predetermined time or every time a predetermined condition is established to be executed.

Figure 10:
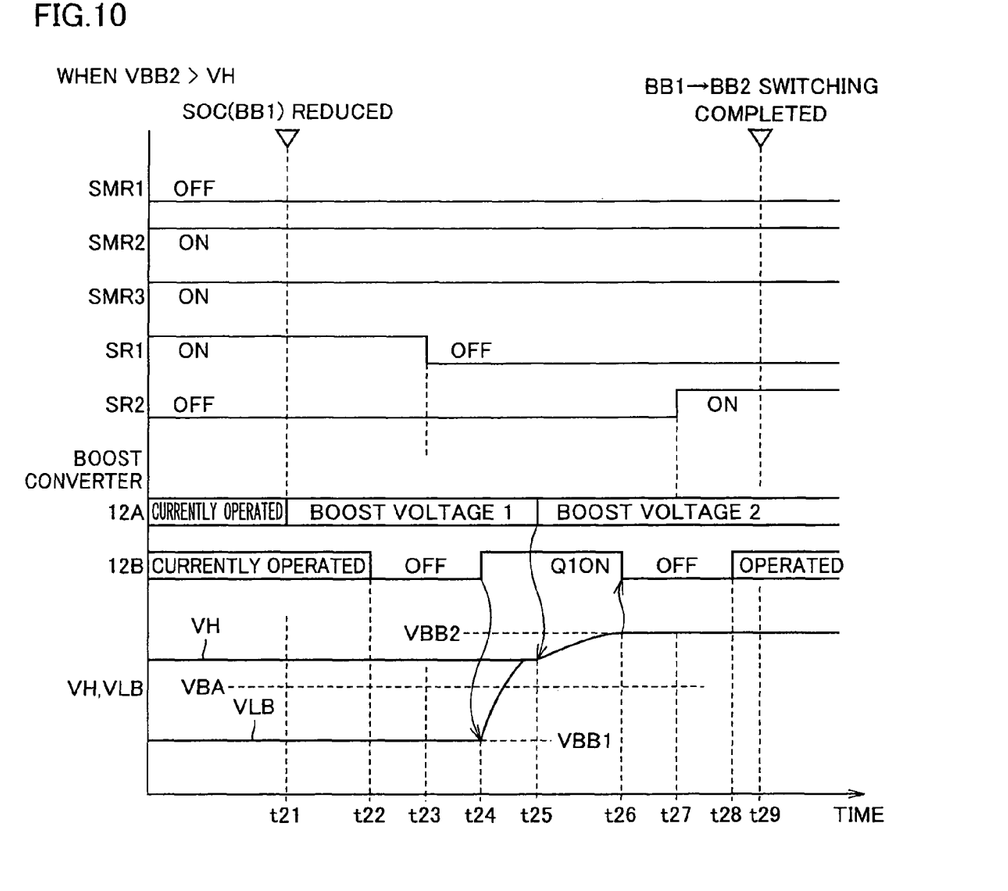
FIG. 10 is an operation waveform chart representing an example when an operation is carried out based on the flow chart of FIG. 9.

FIG. 10 is an operation waveform diagram representing an example when an operation is carried out based on the flow chart of FIG. 9. This operation waveform diagram corresponds to an example executed based on a battery combination, state of charge and boosted state where power supply voltage VBB2 of battery BB2 is higher than voltage VH.

Referring to FIGS. 9 and 10 prior to time t21, system main relay SMR1 and system main relays SMR2, SMR3 are set to an OFF state and an ON state, respectively; battery BB1 is used with relay SR1 at a conductive state; and battery BB2 is not used with relay SR2 at a non-conductive state. Boost converter 12A is currently operating, and voltage VH is boosted higher than voltage VBA. Moreover, boost converter 12B is currently operating, and voltage VH is boosted higher than voltage VLB.

Since the state of charge SOC (BB1) of battery BB1 is equal to at least a predetermined threshold value until time t21, battery exchange is not required. Control proceeds from step S41 to step S56 to return to the main routine.

When control device 30 detects that the state of charge SOC (BB1) of currently-used battery BB1 has become smaller than the predetermined threshold value at time t21, control proceeds from step S41 to step S42 since battery BB1 must be exchanged with battery BB2.

At step S42, control device 30 switches boost converter 12, as shown at time t21-t25, so that voltage VH is maintained at a state higher than the level of voltage VBB1 (indicated as boost voltage 1 in FIG. 10). Accordingly, forward current will not flow to diode D1 of FIG. 3 even if the procedure to cause boost converter 12B to stop at step S43 is carried out at time t22. At step S43, the switching at boost converter 12B is stopped, attaining a shut down state in which both the gates of IGBT elements Q1 and Q2 are OFF.

This eliminates the concern about welding caused by discharge when relay SR1 is disconnected since current will not flow to relay SR1. Therefore, control device 30 sets relay SR1 to an OFF state at time t23 in step S44.

Then, determination is made whether voltage VBB2 of battery BB2 is higher than voltage VH at step S45. The operation waveform of FIG. 10 corresponds to the case of VBB2>VH. Therefore, control proceeds from step S45 to step S46. The operation in the event of VBB2<VH will be described afterwards with reference to FIG. 11.

At step S46, the upper arm of boost converter 12B, i.e. IGBT element Q1 of FIG. 3, is set to an ON state, as shown at time t24. Accordingly, capacitor C2 is also charged at time t24-t25. Voltage VLB rises up to a level substantially equal to voltage VH.

Then, control device 30 causes boost converter 12A to carry out a boost operation with the target level of voltage VH set to the level of voltage VBB2 at step S47 (in FIG. 10, indicated as boost voltage 2). At this stage, the duty ratio is set such that a further boosting operation is carried out at boost converter 12A. The switching of IGBT elements Q1 and Q2 is carried out. As a result, voltage VH is raised towards the level of voltage VBB2 at time t25-t26. In a following manner, voltage VLB also rises towards voltage VBB2.

At step S48, determination is made whether voltage VLB has become equal to the level of voltage VBB2. This determination can be made by identifying whether |VLB−VBB2| is lower than a predetermined threshold value, for example.

In the case where voltage VLB has not yet rose enough and does not reach the level of voltage VBB2 at step S48, control returns to step S47, and the boosting operation is continued.

When voltage VLB becomes substantially equal to voltage VBB2, an excessive current will not be input when relay SR2 is connected. Therefore, control device 30 causes voltage VLB to rise to the vicinity of voltage VBB2. Control proceeds from step S48 to step S49. Boost converter 12B is returned to a shut down state, as shown at time t26. Specifically, the upper arm of boost converter 12B is returned to an OFF state from an ON state. At step S53, relay SR2 is rendered conductive at time t27. At step S54, boost converter 12B is operated again, as shown at time t28. At step S55, battery switching is completed at time t29.

The event of voltage VH being higher than voltage VBB2 at step S45 will be described hereinafter. In this case, control proceeds from step S45 to step S50.

Figure 11:
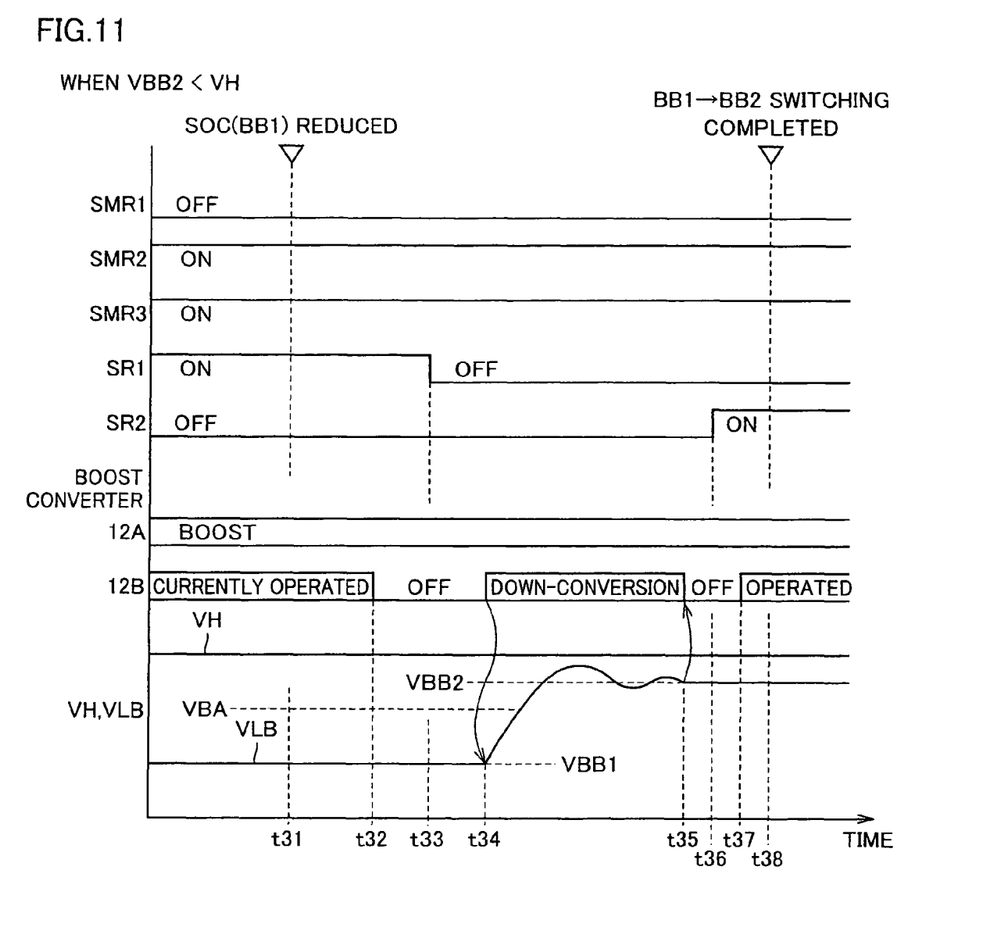
FIG. 11 is an operation waveform chart representing another example when an operation is carried out based on the flow chart of FIG. 9.

FIG. 11 is an operation waveform diagram representing another example when an operation based on the flow chart of FIG. 9 is carried out. This operation waveform diagram corresponds to an example executed based on a battery combination, state of charge, and boosting state where power supply voltage VBB2 of battery BB2 is lower voltage VH.

In FIG. 11, time t31, t32 and t33 correspond to time t21, t22, and t23 of FIG. 10, respectively. Since the waveform change indicated in FIG. 11 prior to time t33 is similar to that in FIG. 10, description thereof will not be repeated.

Referring to FIG. 11, voltage VH is higher than the level of voltage VBB2 at the point of time when relay SR1 is set to an OFF state at time t33. Therefore, control proceeds from step S45 to step S50 in the flow chart of FIG. 9.

At step S50, the switching operation at boost converter 12B is initiated with the target voltage of voltage VLB set at the level of VBB2, indicated as "down conversion" subsequent to time t34. Then at step S51, determination is made whether voltage VLB is substantially equal to voltage VBB2. This determination can be made by identifying whether |VLB−VBB2| has become lower than a predetermined threshold value, for example.

In the case where voltage VLB has not yet approached the level of voltage VBB2 at step S51, control returns to step S50 to continue the voltage-down operation.

Although voltage VLB will first rise in accordance with the charging of capacitor C2 immediately after the operation of boost converter 12B is initiated as shown at time t34, voltage VLB gradually converges towards voltage VBB2 thereafter.

When voltage VLB approaches the level of voltage VBB2 sufficiently so that the condition in step S51 is met at time t35, control proceeds from step S51 to step S52. Control device 30 stops the switching at boost converter 12B.

Then, control device 30 renders relay SR2 conductive at step S53, as shown at time t36. At time t37, the operation of boost converter 12B is resumed. Thus, battery switching is completed at step S55, as indicated at time t38.

Thus, since relay SR2 is connected after adjusting voltage VLB to the vicinity of voltage VBB2 of battery BB2 using boost converters 12A and 12B, a duplicating current path of limiting resistor R and system main relay SMR1 does not have to be provided with respect to battery BB2.

The present embodiment will be described generically with reference to FIGS. 1 and 4 again The vehicle power supply apparatus includes a main power storage device (BA), a power feed line (PL2) through which power is supplied to an inverter (22) that drives a motor (MG2), a first voltage converter (12A) provided between the main power storage device (BA) and the power feed line (PL2) to convert voltage, a plurality of subpower storage devices (BB1, BB2) provided parallel to each other, and a second voltage converter (12B) provided between the plurality of subpower storage devices (BB1, BB2) and the power feed line (PL2) to convert voltage.

The second voltage converter (12B) is selectively connected to any one of the plurality of subpower storage devices (BB1, BB2) to convert voltage.

The vehicle power supply apparatus includes a first connector (39A or 40A) provided between the main power storage device (BA) and the first voltage converter (12A) to make and break electrical connection, and a second connector (39B or 40B) provided between the plurality of subpower storage devices (BB1, BB2) and the second voltage converter (12B) to make and break electrical connection. The second connector (39B or 40B) is controlled to attain a connection state in which any one of the plurality of subpower storage devices (BB1, BB2) is selectively connected to the second voltage converter (12B), and a non-connection state in which none of the plurality of subpower storage devices (BB1, BB2) is connected to the second voltage converter (12B).

The first connector (39A or 40A) includes a first relay (SMR2) connected between the main power storage device and the first voltage converter, and a second relay (SMR1) and a limiting resistor (R) connected in series. The second relay (SMR1) and limiting resistor (R) connected in series are connected parallel to the first relay (SMR2). The second connector (40B) includes a third relay (SR1) connected between a first one (BB1) of the plurality of subpower storage devices (BB1, BB2) and the second voltage converter (12B), and a fourth relay (SR2) connected between a second one (BB2) of the plurality of subpower storage devices (BB1, BB2) and the second voltage converter (12B).

Each of the first to fourth relays (SMR1, SMR2, SR1, SR2) is provided at a side of one electrode of a corresponding power storage device. The one electrode has a polarity identical to each other Each other electrode of the main power storage device (BA) and the plurality of subpower storage devices (BB1, BB2) is connected to a common node (N1). Each other electrode has a polarity opposite to that of the one electrode. The vehicle power supply apparatus includes a fifth relay (SMR3) provided between the common node (N1) and the first and second voltage converters (12A, 12B).

The vehicle power supply apparatus includes a control unit (30) conducting control of the first and second voltage converters (12A, 12B), and conducting opening and closing control of the first to fourth relays (SMR1, SMR2, SR1, SR2). The control unit (30) renders at least one of the first and second relays (SMR1, SMR2) conductive, and has the voltage (VH) on the power feed line (PL2) converted to the voltage (VBB1) of the first subpower storage device (BB1) by the first voltage converter (12A), and then renders the third relay (SR1) conductive.

The vehicle power supply apparatus includes a control unit (30) conducting control of the first and second voltage converters (12A, 12B), and conducting opening and closing control of the first to fourth relays (SMR1, SMR2, SR1, SR2). The control device (30) controls the first and second voltage converters (12A, 12B) such that the power transfer between the first subpower storage device (BB1) and the power feed line (PL2) becomes zero when the third relay (SR1) is changed from a conductive state to a non-conductive state.

The control unit (30) stops the operation of the second voltage converter (12B) after the voltage (VH) on the power feed line (PL2) is increased to a level higher than the voltage (VBB1) of the first subpower storage device (BB1) by actuating any of the first and second voltage converters (12A, 12B) and inverter (22) to cause the power transfer between the first subpower storage device (BB1) and the power feed line (PL2) to becomes zero.

The vehicle power supply apparatus includes a control unit (30) conducting control of the first and second voltage converters (12A, 12B), and conducting opening and closing control of the first to fourth relays (SMR1, SMR2, SR1, SR2). The control unit (30) renders the third relay (SR1) non-conductive, and then renders the fourth relay conductive after adjusting the voltage on the power feed line (PL2) to the voltage of the second subpower storage device by actuating any of the first voltage converter (12A) and inverter (22).

The first subpower storage device (BB1) among the plurality of subpower storage devices and the main power storage device (BA) can output the maximum power tolerable for the electrical load (22 and MG2) connected to the power feed line by simultaneous usage.

The present embodiment was described based on an application to a series/parallel type hybrid system that can have the power from the engine divided between the axle and the power generator by a power split mechanism. However, the present invention is also applicable to a series type hybrid vehicle that uses the engine only to drive the power generator and generates the driving force of the axle with only the motor that uses the electric power generated by the power generator, and to an electric vehicle that runs with only the motor. All these configurations incorporate a power storage device and can have the present invention applied to allow long-distance running with a plurality of power storage devices switched.

It should be understood that the embodiments disclosed herein are illustrative and non-restrictive in every respect. The scope of the present invention is defined by the appended claims rather than the description set forth above, and all changes that fall within limits and bounds of the claims, or equivalent thereof are intended to be embraced by the claims.

The invention claimed is:

1. A vehicle power supply apparatus comprising:
   a main power storage device,
   a power feed line through which power is supplied to an inverter that drives a motor,
   a first voltage converter provided between said main power storage device and said power feed line to convert voltage,
   a plurality of subpower storage devices provided parallel to each other, and
   a second voltage converter provided between said plurality of subpower storage devices and said power feed line to convert voltage,
   said first voltage converter provided exclusive to said main power storage device, and
   said second voltage converter provided to be shared among said plurality of subpower storage devices, and selectively connected to any one of said plurality of subpower storage devices to convert voltage.

2. The vehicle power supply apparatus according to claim 1, further comprising a first connector provided between said main power storage device and said first voltage converter to make and break electrical connection, and
   a second connector provided between said plurality of subpower storage devices and said second voltage converter to make and break electrical connection,
   wherein said second connector is controlled to attain a connection state in which any one of said plurality of subpower storage devices is selectively connected to said second voltage converter, and a non-connection state in which none of said plurality of subpower storage devices is connected to said second voltage converter.

3. The vehicle power supply apparatus according to claim 2, wherein said first connector includes
   a first relay connected between said main power storage device and said first voltage converter, and
   a second relay and a limiting resistor connected in series,
   said second relay and said limiting resistor connected in series are connected parallel to said first relay,
   wherein said second connector includes
   a third relay connected between a first one of said plurality of subpower storage devices and said second voltage converter, and
   a fourth relay connected between a second one of said plurality of subpower storage devices and said second voltage converter.

4. The vehicle power supply apparatus according to claim 3, wherein
   each of said first to fourth relays is provided at a side of one electrode of a corresponding power storage device, said one electrode having a polarity identical to each other,
   each other electrode of said main power storage device and said plurality of subpower storage devices is connected to a common node,
   each said other electrode has a polarity opposite to the polarity of said one electrode,
   said vehicle power supply apparatus further comprising a fifth relay provided between said common node and said first and second voltage converters.

5. The vehicle power supply apparatus according to claim 3, further comprising a control unit conducting control of said first and second voltage converters, and conducting opening and closing control of said first to fourth relays,
   wherein said control unit renders at least one of said first and second relays conductive, and has a voltage on said power feed line converted into a voltage of said first subpower storage device by said first voltage converter, and then renders said third relay conductive.

6. The vehicle power supply apparatus according to claim 3, further comprising a control unit conducting control of said first and second voltage converters, and conducting opening and closing control of said first to fourth relays,
   wherein said control unit controls said first and second voltage converters such that power transfer between said first subpower storage device and said power feed line becomes zero when said third relay is changed from a conductive state to a non-conductive state.

7. The vehicle power supply apparatus according to claim 6, wherein said control unit stops an operation of said second voltage converter after the voltage on said power feed line is increased to a level higher than a voltage of said first subpower storage device by actuating any of said first and second voltage converters and said inverter to cause the power transfer between said first subpower storage device and said power feed line to become zero.

8. The vehicle power supply apparatus according to claim 3, further comprising a control unit conducting control of said first and second voltage converters, and conducting opening and closing control of said first to fourth relays,
   wherein said control unit renders said third relay non-conductive, and then renders said fourth relay conductive after adjusting a voltage on said power feed line to a voltage of said second subpower storage device by actuating said first voltage converter.

9. The vehicle power supply apparatus according to claim 1, wherein a first one of said plurality of subpower storage devices and said main power storage device can output a maximum power tolerable for an electrical load connected to said power feed line.

10. The vehicle power supply apparatus according to claim 1, further comprising a single control unit conducting control of said first and second voltage converters, and conducting opening and closing control of relays that carry out connection and disconnection between said main power storage device and said first voltage converter, and connection and disconnection between said subpower storage device and said second voltage converter,
    wherein said control unit further controls said inverter.

11. A vehicle incorporating the vehicle power supply apparatus according to claim 1.

12. The vehicle power supply apparatus of claim 1, wherein the second voltage converter is capable of being selectively connected to less than all of the plurality of subpower storage devices.

13. The vehicle power supply apparatus of claim 1, wherein each of the plurality of subpower storage devices includes at least one of a capacitor and a battery.

* * * * *